April 19, 1960 A. A. DE YAKIMAC 2,933,603
SCINTILLOSCOPE
Filed Aug. 6, 1956 2 Sheets-Sheet 2

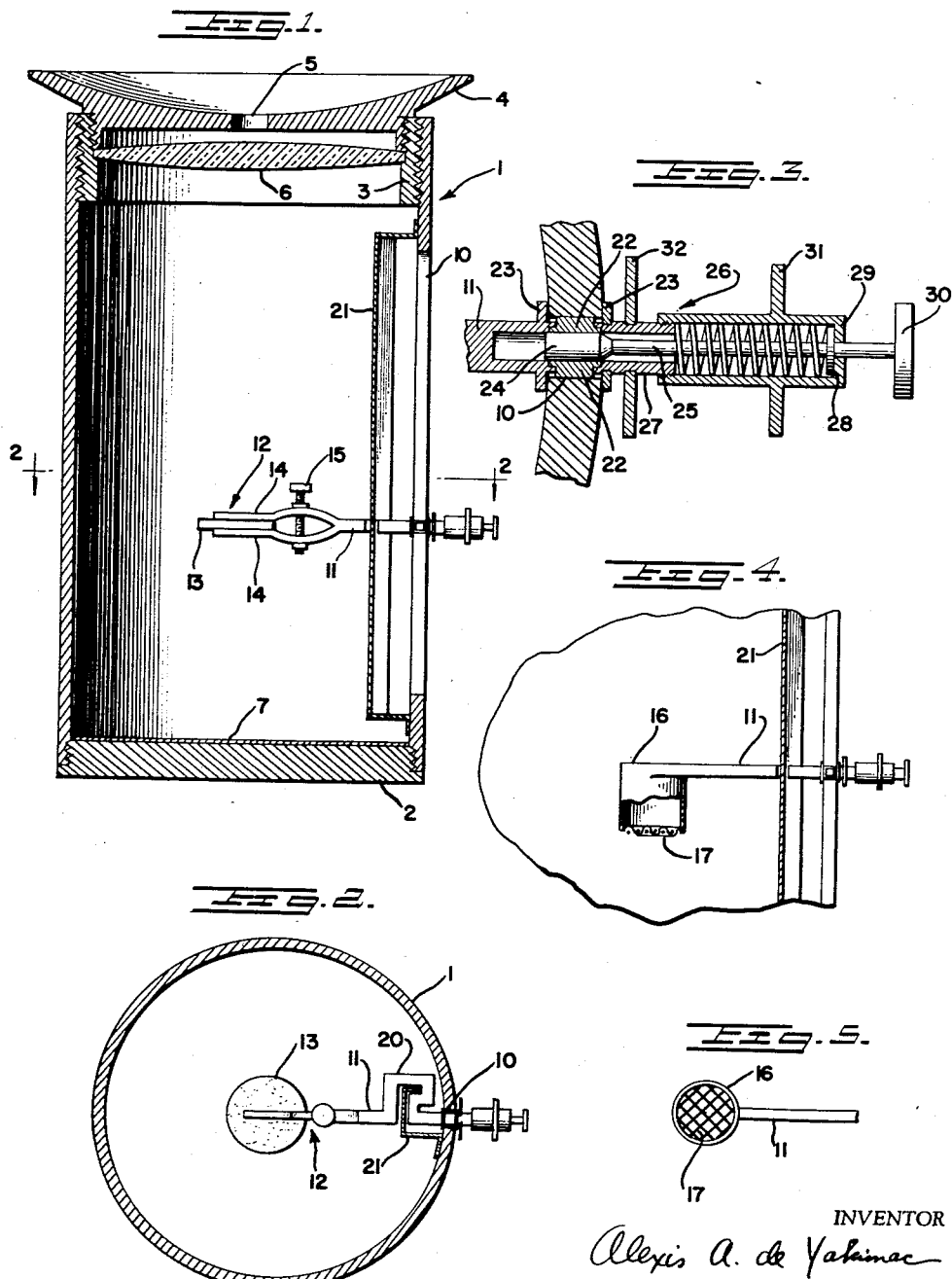

INVENTOR
Alexis A. de Yakimac
BY Albert N. Kirchner
ATTORNEY

United States Patent Office 2,933,603
Patented Apr. 19, 1960

2,933,603

SCINTILLOSCOPE

Alexis Alexis de Yakimac, Miami Beach, Fla.

Application August 6, 1956, Serial No. 602,338

12 Claims. (Cl. 250—78)

The present invention relates to scintilloscopes, i.e., devices for detecting and demonstrating radiant emanations, and more particularly to an instrument for visually responding to the radioactive rays, including particularly the alpha rays, of small samples of radioactive materials.

Particular objects of the invention are concerned with providing a simple device that can be manufactured at low cost and be operated by the student or the practical assayer or prospector, without the exercise of any special skill, to cause radioactive rays to produce visual effects for the purpose of educational demonstration or instruction merely, or for the purpose of making qualitative and/or quantitative determinations of samples of unknown degrees of radioactivity.

Related objects are to provide a device incorporating improved mechanism and structure adapted to be used for purposes related to the foregoing, e.g., in the determination, demonstration, comparison and evaluation of radiant emanations, other than alpha rays, which are capable of activating a luminescent screen and hence of producing determinations of the substances generating the rays.

In various preferred forms of embodiment the devices contemplated by the present invention may be used as demonstration apparatus for exhibiting the luminous effects of radioactive materials or, with slight modification but well within the spirit of the invention, as instruments for making practical qualitative and quantitative determinations of ore samples and providing absolute or relative measurements of the degree of radioactivity thereof.

A principal object of the invention is to provide a device of the character indicated that will be simple and inexpensive to construct, reliable and easy to use, and durable over a long period of operation.

A more specific object is to produce a scintilloscope incorporating a holder for a sample of radioactive material and a luminescent screen sensitive to the radioactive emanations from the sample, with means for moving the holder and the screen relatively to each other to spacings of predetermined values, with means for observing the luminous effects of the emanations on the screen as the basis for conclusions as to the degree of radioactivity or the concentration of the particular rays (alpha, beta and gamma) of the sample.

A further more specific object is to provide a practical instrument for quickly determining the commercial value, i.e., the richness or leanness, of samples of ores of radioactive material.

With the foregoing and other objects in view, as will be evident from the explanation hereinafter, the invention comprises the principles shown in certain presently preferred forms of embodiment in the accompanying drawings, in which—

Figure 1 is an axial sectional view of an instrument comprising a first species of the invention;

Figure 2 is a transverse cross sectional view of the Fig. 1 embodiment, taken on the line 2—2 of Fig. 1;

Fig. 3 is a detail transverse cross sectional view of the spacing adjustment mechanism of the Fig. 1 embodiment, on a relatively enlarged scale;

Fig. 4 is a detail axial sectional view showing an alternative form of sample holder;

Fig. 5 is a plan view of a portion of the sample holder shown in Fig. 4;

Figure 6:
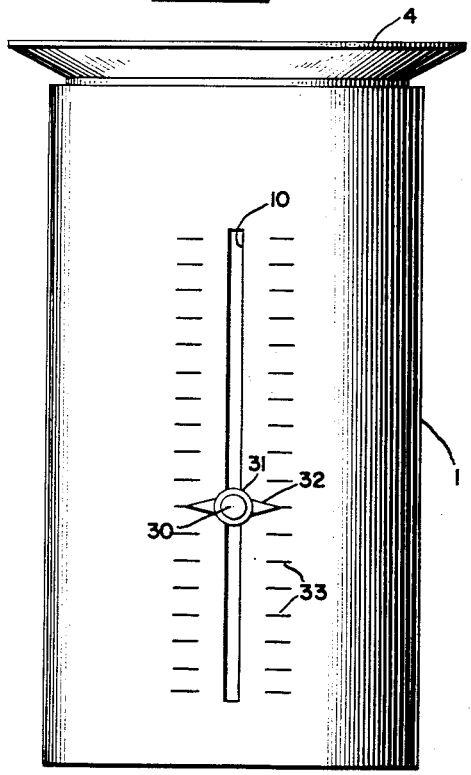
Fig. 6 is a side elevational view of the instrument shown in Fig. 1.

Referring now to the figures, Fig. 1 shows at 1 a generally closed casing which is best made cylindrical in form and of metal having screwthreaded into its bottom a closure 2 forming a floor and having a screwthreaded into its top a sleeve 3 which is internally threaded to receive a top closure 4 constituting an eyepiece having a small central aperture 5 overlying a low power magnifying glass 6 which has its peripheral margin clamped between the eyepiece and a shoulder formed in the sleeve 3.

The floor 2 of the casing is internally coated with a luminescent screen 7 which is best made of suitable fluorescent or phosphorescent material, i.e., material capable of being activated to luminescence by radioactive ray impingement. As is well known, there are many inexpensive and easily obtained and applied materials of this kind now available. Zinc sulphide is entirely satisfactory for the purposes of the present invention and hence may be named as a typical member of the available group of materials.

The cylindrical side wall of the casing is slotted lengthwise, as shown at 10, throughout substantially its entire length, to admit or pass an arm 11 carrying at its inner end a holder 12 for mounting a sample or specimen 13 of radioactive or equivalent or analogous material in substantially the line of the axis of the casing. In the form of the invention shown in Figs. 1 and 2 this holder comprises a pair of thin jaws or fingers 14 into which the inner end of the arm is divided and which are clamped into holding relationship with the upper and lower surfaces of the sample 13 by a screw 15, although the fingers could as well grip the side surfaces of the sample and thus have less interfering effect on emanations aimed at the screen 7. In Figs. 4 and 5 the holder comprises a small receptacle 16 carried by the inner end of the arm 11 and provided with a bottom grating 17 of relatively widely spaced fine wires. It will be understood that it is desirable, for obvious reasons, to reduce to a minimum the shielding or interference of the holder parts with relation to the sample 13 and the emanations therefrom, so that the fingers 14 are made as thin as is conveniently possible, and the wire forming the grating 17 is made quite fine and of coarse mesh.

Of course other forms of holders can be used, as will be understood.

The arm 11 is provided with a sharp offset portion 20 which extends angularly around a light trap shield 21 in the form of a right angularly bent plate or strip of metal fastened on the inside wall of the casing along the slot 10. This is for the purpose of preventing, or of minimizing, ingress of light through the slot.

The construction includes means for setting the arm 11 at selected adjusted positions along the length of the slot 10, and for this purpose any convenient mechanism or construction may be provided. The illustrated form of the invention uses a pair of expansion shoes 22 set in a reduced portion of the arm 11, within the confines of the wall of the casing 1 and riding in the slot 10 thereof. These are held in place lengthwise of the arm by flanges 23, 23 formed on the arm in engagement with the inner and outer surfaces of the casing wall, and the shoes are free to expand against the surfaces of the slot 10 under the influence of a generally conical or very gradually tapered plunger 24 when the plunger is in the shoe-engaging position shown in Fig. 3. The plunger is carried by a stem 25 contained within a housing 26 and reacting between a reduced portion 27 of the housing and a flange 28 which is fast on the stem 25 and is normally engaged with the outer end wall 29 of the housing. A button 30 serving as a thumb piece is formed on the outer end of the stem and a finger piece 31 is formed on the spring casing 26, so that the stem can be pushed inwardly, against the tension of the spring, so as to loosen the pressure of the shoes 22 in the slot 10 and permit the arm 11 to be moved up or down in the casing. This of course moves the holder 12, and hence the sample 13 within it, toward or away from the luminescent screen 7. An index pointer 32 is formed on the portion 27 of the spring housing and cooperates with the indicia of a scale 33 inscribed on the exterior wall of the casing along the slot to indicate the setting of the holder. It is useful to graduate the scale indicia in sixteenths of an inch, but of course metric system units may be used if preferred.

In use, for the purpose of demonstrating the effect of rays emanating from a sample of radioactive material, the casing is opened by removing the bottom 2 or the top closure 4 and the lens 6. The arm 11 is lowered toward the bottom of the slot or raised toward the top, and the sample is placed in the holder 12 or 16. The casing is then closed by restoring the lens and closure 4 or the bottom 2 to their positions shown in Fig. 1, and the arm 11 is moved up or down, to bring the holder 12 close enough to the screen 7 to cause luminescence to be detected through the eyepiece. When samples of relatively strong radioactivity are used, and/or the sample is set close to the screen, such luminescence is generally observed in the form of a halo of light surrounding the edges of the sample; with weaker samples and/or greater distances between sample and screen, a sparking effect is seen as the individual helium atoms which comprise the alpha rays strike the screen. The recommended procedure is for the observer to wait until his vision becomes adjusted to the darkness within the casing, and when luminescence is observed, to withdraw the sample back from the screen until the luminescence is just barely visible. This may be regarded as the maximum distance at which the rays produce a visible effect, or at least an effect visible to the particular observer. A reading indicating this distance may be taken from the scale 33.

Such visual demonstration of the effects of alpha rays is an important object of the invention, and it will be obvious that to embody the inventive principles in a device capable of achieving this object it is not necessary to make the sample removable, nor is it necessary to provide the device with a scale for showing the distance between the sample and the screen. A simple demonstration device may comprise a very small specimen of radioactive material permanently fixed in a needle type of arm substituted for the clamp-carrying or receptacle-carrying arm 11. The size of such a demonstration form of the device may be much smaller than a commercial embodiment for testing ore samples or the like.

If comparisons of different samples are to be made, as in commercial or industrial use, in order to make qualitative determinations of their relative radioactivity, it is necessary only to mount the different samples successively in the holder and note the distances on the scale 33 at which they begin to show luminescence, or at which they produce apparently identical degrees of luminescence. The ratio of distances indicated by the scale is an accurate ratio of radiation. For practical use, in making qualitative determinations of ore samples it is useful to compare samples of unknown degrees of radioactivity with a sample of known degree. If a standard sample, of given weight, volume and dimensions, having a known degree of radioactivity which is established as the minimum degree for commercial value, is tested and a reading taken at the distance on the scale 33 at which the halo appears on the screen 7, this reading may be considered a zero setting. Tests may then be made of ores of unknown radioactivity by taking samples of the same or substantially the same weight, volume and dimensions as the standard and noting whether or not the halo appears on the screen at the calibration selected as the zero setting. In this way ores may be quickly rated positive or negative from the standpoint of commercial value, and by noting the exact setting at which the halo appears a quantitative determination of the degree of radioactivity is had.

In making quantitative determinations it may be found convenient to establish certain points on the scale as those at which the halo begins to appear for each of a series of standard samples of known degrees of radioactivity. Samples to be tested can then be quickly rated with relation to these points, much in the general manner of mineral hardness tests, specific gravity determinations, etc., and other operations involving the use of a series of standards.

Figure 7:
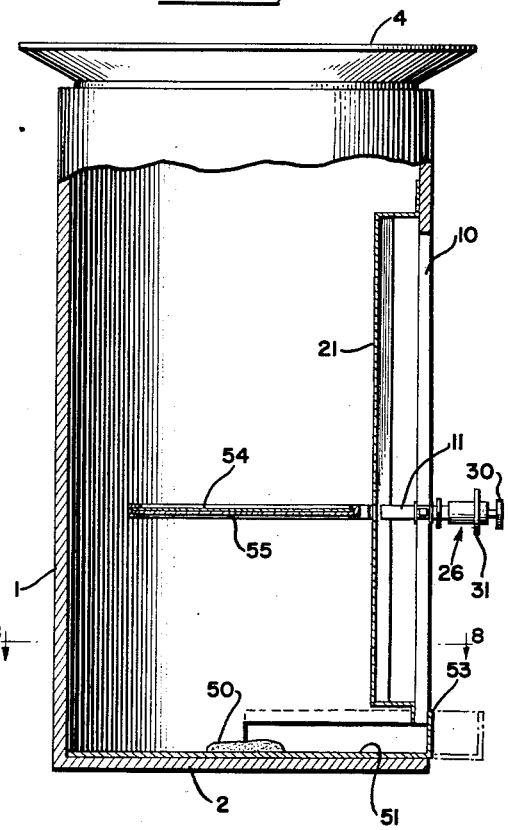
Fig. 7 is a view similar to that of Fig. 6 but showing a modification.
Figure 8:
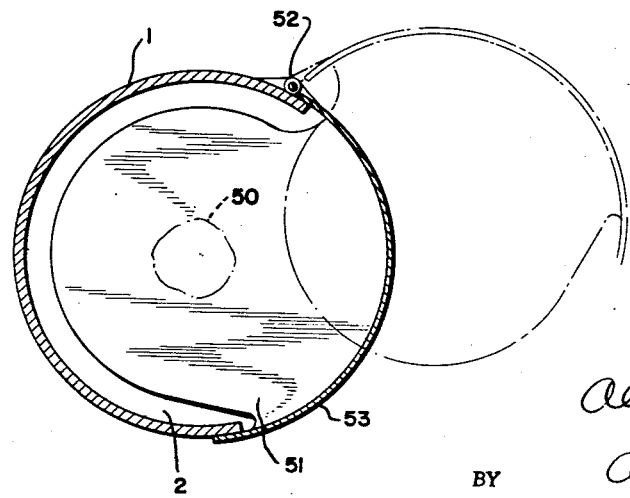
Fig. 8 is a transverse cross sectional view taken on the line 8—8 of Fig. 7.

It will be appreciated that the principle of the device in the form of construction thus far explained involves mounting a sample or specimen and a luminescent screen for relative movement toward and away from each other. In this construction the screen is fixed and the sample holder is movable. The invention may be embodied in a construction in which this arrangement is reversed, as shown in Figs. 7 and 8.

In these figures means is provided for fixing a sample 50 on a drawer 51 which is slidable in and out of the casing 1, in more or less engagement with the floor 2 thereof, or is swingable in and out about a hinge pivot 52. Of course a flange 53 or equivalent means is provided to exclude light from the casing when the drawer is in closed position. The arm 11 in this form of the invention carries at its inner end a disc 54 of glass or transparent plastic having a luminescent screen 55, preferably formed on its under surface. All other elements of the first explained embodiment of the invention may be included in this modified form. These comprise the scale and pointer, the thumb and finger pieces, the light trap, eyepiece, etc., all as indicated in Fig. 7.

Determinations are made with this form of the device in precisely the same manner as the Fig. 1 form. With a sample placed in the center of the drawer 51 and the drawer closed, the arm 11 is adjusted along the scale 32 until a halo on the screen 55 is seen through the aperture 5 in the top closure 4.

Because of differences in visual acuity of different observers, it is suggested that comparative determinations of a series be all made by the same person. If quantitative determinations are to be made, using as the zero setting the halo point of a standard "minimum" sample, it may be found desirable for the observer to check for himself the appearance of the halo for the standard minimum sample, thus ruling out any error that might be attributable to the observer's own personal eyesight characteristics.

It may be appropriate to explain that the effects exhibited by the device can be limited to those of alpha ray emanations, rather than beta or gamma rays, if the device be made on such a scale and size as to cause appearance and disappearance of the effects consequent upon movements of the sample through the range of alpha ray action, e.g., a spacing of only a few centimeters from the screen. In other words, the invention being embodied in a device in which the distance between the sample and the screen is within the range of action of alpha rays, i.e., four centimeters or less, and the range of action of beta and gamma rays being much greater distances, the appearance and disappearance of the effects must be due principally to the alpha rays emanating from the sample even though the material of the sample be known to produce all three kinds of rays, just as effects produced from such a sample at distances much greater than four centimeters must be regarded as due practically entirely to beta and gamma rays.

That is to say, the effects exhibited by the device can be limited to those of alpha rays by using specimen or sample material producing alpha rays exclusively, such as polonium, radio-thorium, etc. When the specimen or sample used as the source of the rays is one that emits various rays, such as alpha, beta and gamma rays, and when the distance between the source and the screen is within the alpha ray range, i.e., not more than 4 cm., the luminescent effect on the screen should be imputed mainly to the alpha rays since, for equivalent quantities, alpha rays have practically infinitely greater ionization and luminescent power than beta and gamma rays. Only when the operation is practiced beyond the alpha ray range, i.e., through more than 4 cm. of air, so that all alpha rays that might be present are absorbed, should the luminescent effects be imputed to beta and gamma rays.

It may be stated here that the preferred form in which the invention is intended to be embodied is a device for demonstrating or determining alpha rays. However, within the broader principles of the invention as pointed out by the broader of the appended claims, the invention may be embodied in devices of larger size and proportions for demonstrating or determining emanations of other rays.

In the present explanation the screen coating has generally been characterized as luminescent. With no intention of introducing any unnecessary limitation into the claims by use of this term, it may be stated that the invention is operable with the use of any screen coating material which is luminescent when impinged by alpha rays (or such other rays as may be detectible by modifications of the device in respect of size and proportions). Of course a familiar example of such a coating is any one selected from the class of materials called fluorescent, i.e., materials which emit visible light rays while being impinged by rays from an outside source. As has been explained, zinc sulphide is an example of such material. Other salts, such as calcium tungstate, calcium sulphide, etc., are also examples of substances that may be used for this purpose. It will be appreciated that within the broad principles of the invention, using devices having the physical constructions herein described, it may be found possible or desirable to use screens of material that is phosphorescent, i.e., capable of emitting visible light after impingement by rays from an outside source.

For use in educational and demonstration work the device is particularly designed and intended to exhibit the action of individual atoms. To accomplish this object the radioactive source must be composed of material emitting pure alpha rays, with no other rays present. Such materials include polonium, radio-thorium, and proper radioisotope, etc. Since alpha rays are chemically the element helium, it is possible, by observing the occurrence of individual sparks on the luminescent screen, to see the result of atomic bombardment of the helium atoms on the crystal surface of the luminescent material.

With the invention thus explained in terms of certain preferred forms of embodiment, it is believed to be evident that the principles of the invention are capable of being incorporated in other and further modified forms, all within the scope and purview of the broader of the appended claims.

I claim:

1. A device for detecting and demonstrating radiant emanations from a specimen comprising a rigid, closed casing, a specimen holder and a luminescent screen, means mounting said holder and screen within the casing and fully enclosed thereby for relative movement toward and from each other, means holding said holder and screen at an adjusted fixed distance apart, and an eyepiece in the casing for viewing the screen to observe luminescence produced therein by a specimen in the holder at said adjusted spacing of the holder from the screen.

2. A device for detecting and demonstrating radiant emanations from a specimen comprising a rigid, closed casing, a specimen holder and a luminescent screen, means mounting said holder and screen within the casing and fully enclosed thereby for relative movement toward and from each other, means holding said holder and screen at an adjusted fixed spacing from each other, an eyepiece in the casing for viewing the screen to observe luminescence produced therein by a specimen in the holder at said adjusted spacing of the holder from the screen, and a scale on the exterior of the casing for indicating the spacing of the holder from the screen.

3. A device for detecting and demonstrating radiant emanations from a specimen comprising a rigid, closed casing, a luminescent screen fixed in the bottom of the casing, a specimen holder mounted in the casing above the screen, means for adjustably fixing the spacing of the holder above the screen, and an eyepiece in the upper portion of the casing for viewing the screen to observe luminescence produced therein by a specimen in the holder at said adjusted spacing of the holder from the screen.

4. A device for detecting and demonstrating radiant emanations from a specimen comprising a rigid, closed casing, a luminescent screen fixed in the bottom of the casing, a specimen holder mounted in the casing above the screen, means for adjustably fixing the spacing of the holder above the screen, an eyepiece in the upper portion of the casing for viewing the screen to observe luminescence produced therein by a specimen in the holder at said adjusted spacing of the holder from the screen, and a scale on the exterior of the casing for indicating the spacing of the holder from the screen.

5. A device for detecting and demonstrating radiant emanations from a specimen comprising a rigid, closed casing, a luminescent screen mounted in the casing above the bottom thereof, means for moving said screen toward and away from the bottom of the casing and for fixing the screen at adjustably spaced distances from said bottom, and an eyepiece in the upper end of the casing for viewing the screen to observe luminescence produced therein by a specimen fixed in position on the bottom of the casing.

6. A device for detecting and demonstrating radiant emanations from a specimen comprising a rigid, closed casing, a luminescent screen mounted in the casing above the bottom thereof, means for moving said screen toward and away from the bottom of the casing and for fixing the screen at adjustably spaced distances from said bottom, an eyepiece in the upper end of the casing for viewing the screen to observe luminescence produced therein by a specimen fixed in position on the bottom of the casing, and a scale on the exterior of the casing for indicating the spacing of the screen above the bottom of the casing.

7. The combination claimed in claim 3, in which the holder comprises an arm extending through a slot formed lengthwise in the casing.

8. The combination claimed in claim 3, in which the holder comprises an arm having one end portion extending through a slot formed lengthwise in the casing and having at its other end a pair of jaws for clamping a specimen.

9. The combination claimed in claim 3, in which the holder comprises an arm having one end portion extending through a slot formed lengthwise in the casing and having at its other end a receptacle for containing a specimen and having a foraminous bottom for minimizing interference with emanations from the specimen.

10. The combination claimed in claim 5, including a specimen holder positioned in the bottom of the casing.

11. The combination claimed in claim 5, including a specimen holder mounted in the lower portion of the casing and pivoted for movement out of the casing for reception of a specimen.

12. The combination claimed in claim 3, in which the eyepiece is removable from the casing to provide access to the holder.

References Cited in the file of this patent

UNITED STATES PATENTS

| | | |
|---|---|---|
| 1,242,377 | Schmidt | Oct. 9, 1917 |
| 2,051,208 | Greenwood | Aug. 18, 1936 |
| 2,205,853 | Jany | June 25, 1940 |
| 2,217,991 | Peck et al. | Oct. 15, 1940 |